INVENTOR:
Daniel S. Belden,
By
ATTORNEY.

Patented Feb. 21, 1933

1,898,168

UNITED STATES PATENT OFFICE

DANIEL S. BELDEN, OF LOS ANGELES, CALIFORNIA, ASSIGNOR TO FILTROL COMPANY OF CALIFORNIA, OF LOS ANGELES, CALIFORNIA, A CORPORATION OF CALIFORNIA

PROCESS FOR SAFELY DISTILLING AND DECOLORIZING MINERAL OILS

Application filed June 10, 1929. Serial No. 369,855.

This invention relates to a method by which mineral oils such as lubricating oils, gasoline or kerosene, may be simultaneously safely distilled and decolorized.

Among the objects of the invention is to distill lubricating oils while decolorizing them, the distillation being aided by a stream of inert gas injected into the oil being distilled, thereby avoiding substantial oxidation and cracking.

Another object of the invention is to produce a lubricating oil of high viscosity, high fire and flash tests, low carbon content as estimated by the Conradson test and of a pale color. By my process such an oil may be produced from either a crude, a straight distilled cut, a long residuum or from used automobile crank case oil.

Another object of my invention is to produce, by practice of the form of the process in which nitrogen is used, an oil suitable for use in transformers, the oil being of extremely high dielectric strength. The use of $CO_2$ gives an oil of fairly high dielectric coefficient.

A particular advantage of my invention resides in being able, by the use of inert gas, to produce such oils and to carry out such operations with little or no fire risk. This feature makes possible the redistillation and decolorization of such materials as dry-cleaners' dirty gasoline and used automobile crank case oil in congested city areas without danger.

My process, in brief, comprises either distilling such an oil with $CO_2$ or nitrogen from a mixture of the oil with a clay type of adsorbent or by distilling the unmixed oil with either of the two inert gases and passing the produced vapors through layers of the clay adsorbent either at atmospheric or less than atmospheric pressure. While finely divided fuller's earth is a suitable adsorbent for the process, much better results are obtainable by the use of an acid-activated clay of the smectite or bentonite type. The adsorbent known commercially as "Filtrol" is such a clay and is the preferred adsorbent for use in my process. It is made by a process somewhat similar to that described in United States Patent No. 1,397,113 to P. W. Prutzman.

For illustrative purposes only I show two types of apparatus in which my process may be carried out. Other apparatus may be used.

Figure 1:
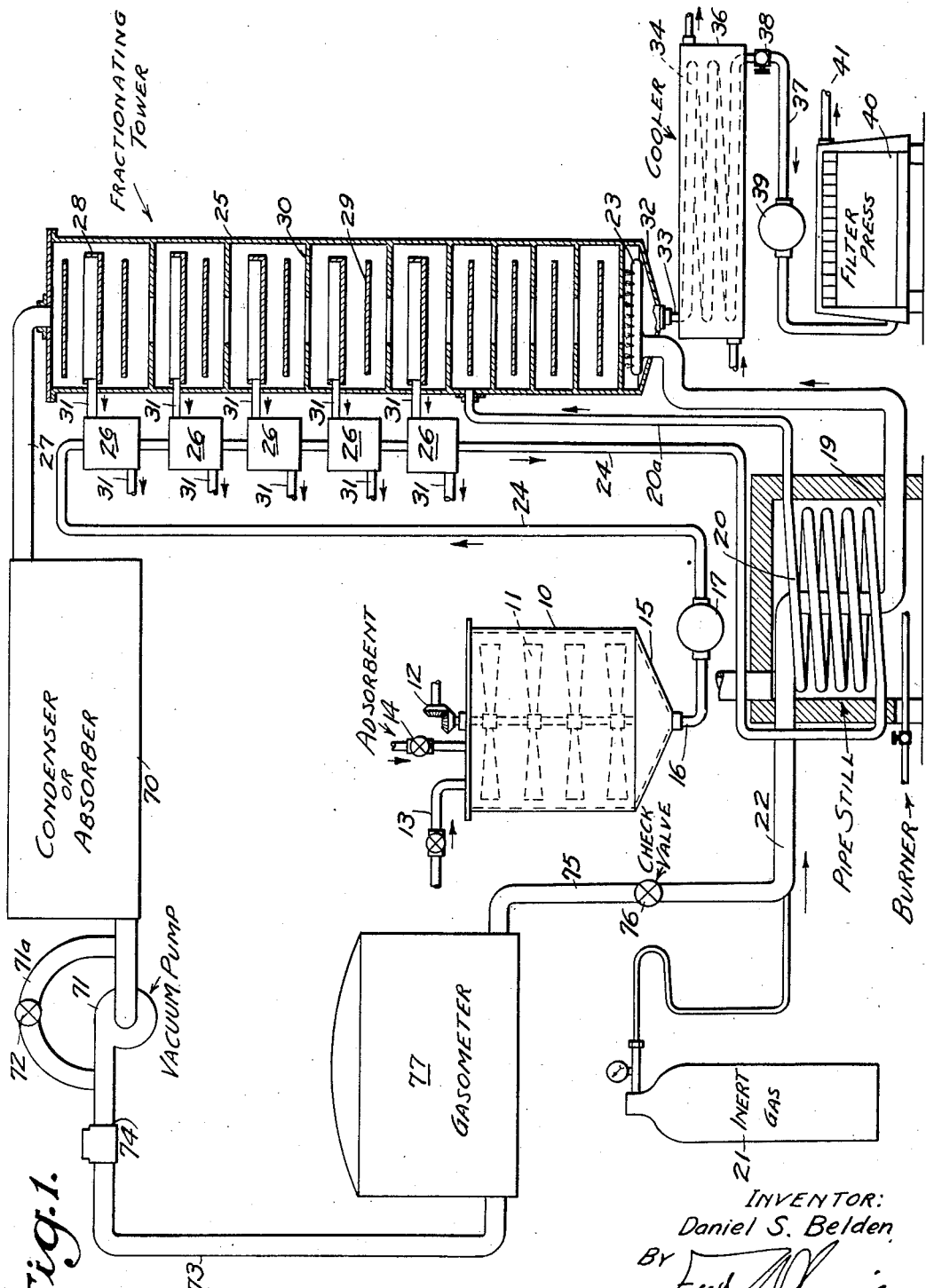
Fig. 1 is a side elevation, more or less diagrammatic, in which the liquid-phase contacting of the oil is continuously accomplished.

In Fig. 1, 10 represents a mixing vessel which is provided with an agitator 11 driven through a pair of bevel gears 12. An inlet pipe 13 is provided for oil and another inlet pipe 14 for powdered adsorbent. The vessel is provided with a conical bottom 15, from the lowest point of which there is a discharge pipe 16 in which there is a pump 17. By means of the pipe and the pump, a pipe still 19, having therein a coil 20, may be supplied with oil-adsorbent mixture.

Figure 2:
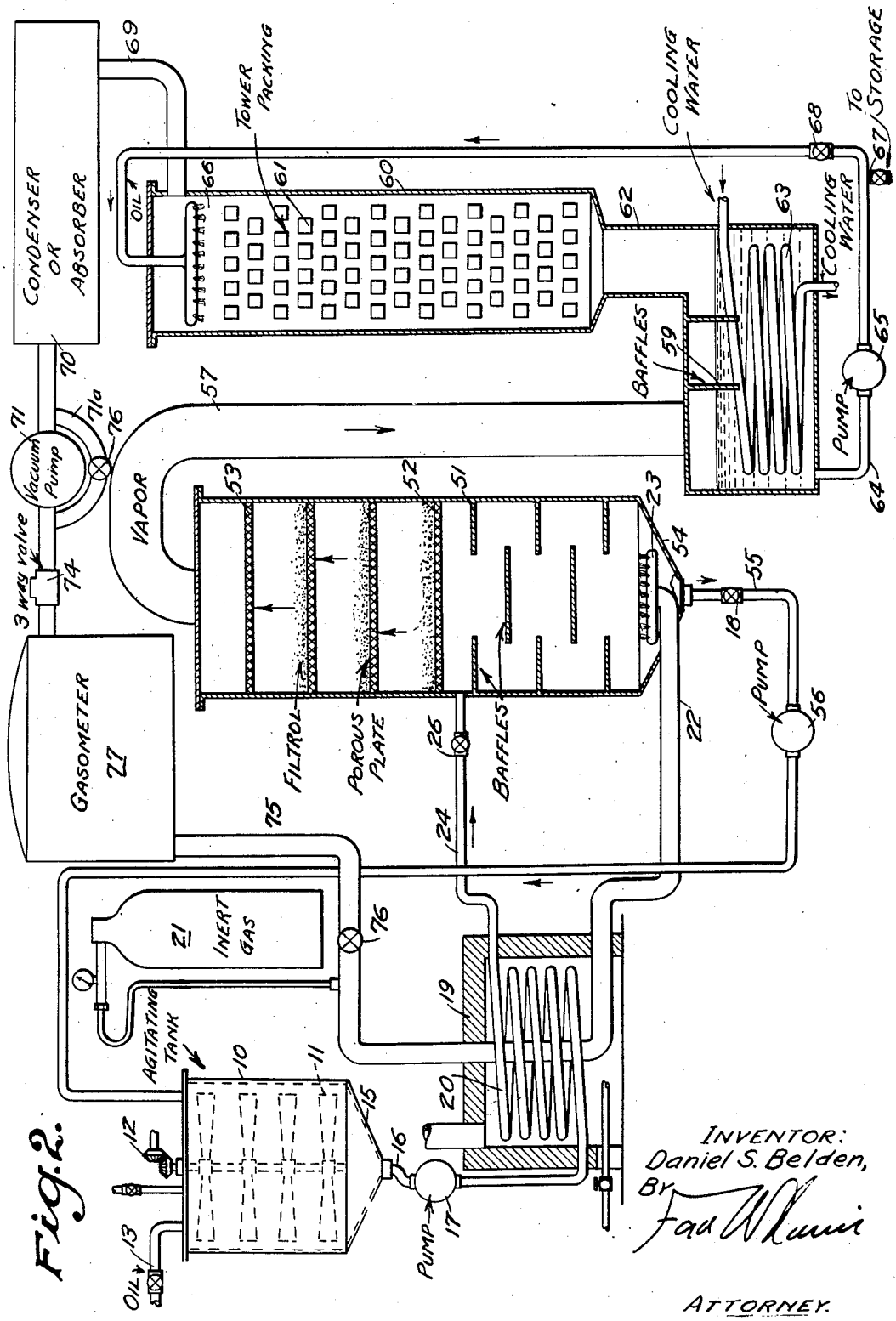
Fig. 2 is a corresponding view of an apparatus in which the oil contacts continuously with the adsorbent while the former is in the vapor phase.

A pipe 24 connects the discharge end of the pump 17 with a fractionating column 25 which may be either of the tray type here shown or of the more common "bubble tower" type. A countercurrent stripping tower such as is shown in Fig. 2 may also alternatively be used. The pipe 24 first runs to the top of the column 25 and then reverses its direction, then leading downward through a plurality of heat exchangers 26. From the top of the column an exit pipe 27 serves as an exit for mixed light hydrocarbon vapors and inert gas.

The pipe 24 connects the heat exchangers 26 with the pipe still 19 having therein the coil 20, the end of which, 20a, connects with the column 25 near the middle thereof. A cylinder of inert gas 21 is arranged to discharge through a pipe 22 which also passes through the furnace of the pipe still and thence into the bottom of the column 25, where it terminates in a distributing ring 23.

The upper and middle parts of the column 25 are provided internally with trays 28 which are adapted to hold a shallow column of liquid and to deliver the latter through pipes 31 through the heat exchangers 26 and thence to storage for the various oil fractions. Alternating with the trays 28 and with each other are central baffles 29 and peripheral baffles 30, so arranged that overflow from the trays, or other condensate, may be first dispersed by the baffles and then collected in the next lower tray A conical bottom 32 of the column 25 is provided with an outlet pipe 33 which connects with a coil 34 of a cooler 36 preferably arranged for water cooling. A pipe 37, provided with a valve 38 connects the cooler with a filter press 40, or its equivalent, from which oil may be run to storage through a pipe 41, or this oil may be returned to the agitating tank 10.

The exit pipe 27 connects with a condenser or charcoal absorber 70, to which there is connected a vacuum pump 71 about which there is a by-pass 71a having therein a valve 72. A pipe 73, in which there is a three-way valve 74, permits optional exhaustion of inert gas to the atmosphere or to a gasometer 77, from which the gas may be returned to the system through pipes 75 and 22. A check valve 76 is provided in the pipe 75 to prevent back pressure on the gasometer from the high pressure supply in the cylinder 21. It will be seen, therefor, that a complete circuit has been provided for inert gas through the system.

When my process is operated in the above apparatus, oil is run into the mixing tank 10, the agitator started, and from 1% to 30% of finely divided adsorbent clay is added. This mixture is fed by the pump 17 through the pipe 24 into the heat exchangers 26, where it receives a preliminary warming. It then flows through the coil 20 of the pipe still 19, in which it is heated by direct flame to a temperature of from 500° to 800° F., the most viscous oils demanding the highest temperatures. Circulation is rapid so that a minimum of cracking ensues.

Before and during the discharge of oil and adsorbent from the pipe 24, a stream of inert gas, preferably nitrogen, but permissibly CO, is turned into the tower 25 from the cylinder 21, through the pipe 22 and the distributing ring 23, in the bottom of the tower. The path of the pipe 22 through the pipe still 19 is so arranged that the gas is heated to approximately the same temperature as the oil.

Before any substantial discharge of oil into the tower 25 is permitted, the apparatus is exhausted of air by operating the vacuum pump 71 with exhaust to the atmosphere. Distillation under vacuum is preferred, but in refining some oils it may be dispensed with, in which case the vacuum pump is not operated and the by-pass valve 72 is left open. The valve 74 is left open to the atmosphere until most of the air has been displaced from the system by the hydrocarbon vapors and then it is adjusted to connect with the gasometer 77.

The hot oil is then discharged into the column 25 at a point just below the lowest tray 28. From this point it cascades down the various baffles 29 and 30 below the point of entry, from which baffles such fractions as are volatile at the temperatures employed evaporate. It is intended that the fractions which volatilize in the tower and condense on the trays are to be the main products of the process, yet one may so proceed that the oil which collects in the bottom of the column is also a valuable product. This fraction, after being cooled in the cooler 36 and pumped by a pump 39 through the filter press 40 may either be sent to storage through the pipe 41 or may be returned to the agitating tank 10 for further refining.

The various fractions which condense in the trays 28 flow out of the tower through the pipes 31 and the heat exchangers 26 in which they are cooled by oil on its way to the pipe still. The fractions are run to their respective storage vessels.

The action of the streams of inert gas which flow from the ring 23 during distillation is threefold. They assist volatilization of the oil, protect it from darkening from oxidation and diminish the inflammability of the vapors.

The very lightest vapors, such as those of gasoline, do not condense in the tower 25 and these find their way, together with the inert gas, out through the pipe 27 into the condenser or charcoal absorber 70, where they are separated from the inert gas. The latter may either be allowed to exhaust to the atmosphere through the valve 74 or may be returned to the gasometer 77 and thence to the system for reuse.

The vacuum pump 71 should be of such a size and run at such a speed that a reasonably good vacuum is maintained within the tower 25 despite the tendency of the inert gas supply to break it. The higher the vacuum, the better the operation, under such conditions, and the less cracking of oil as a result.

Figure 3:
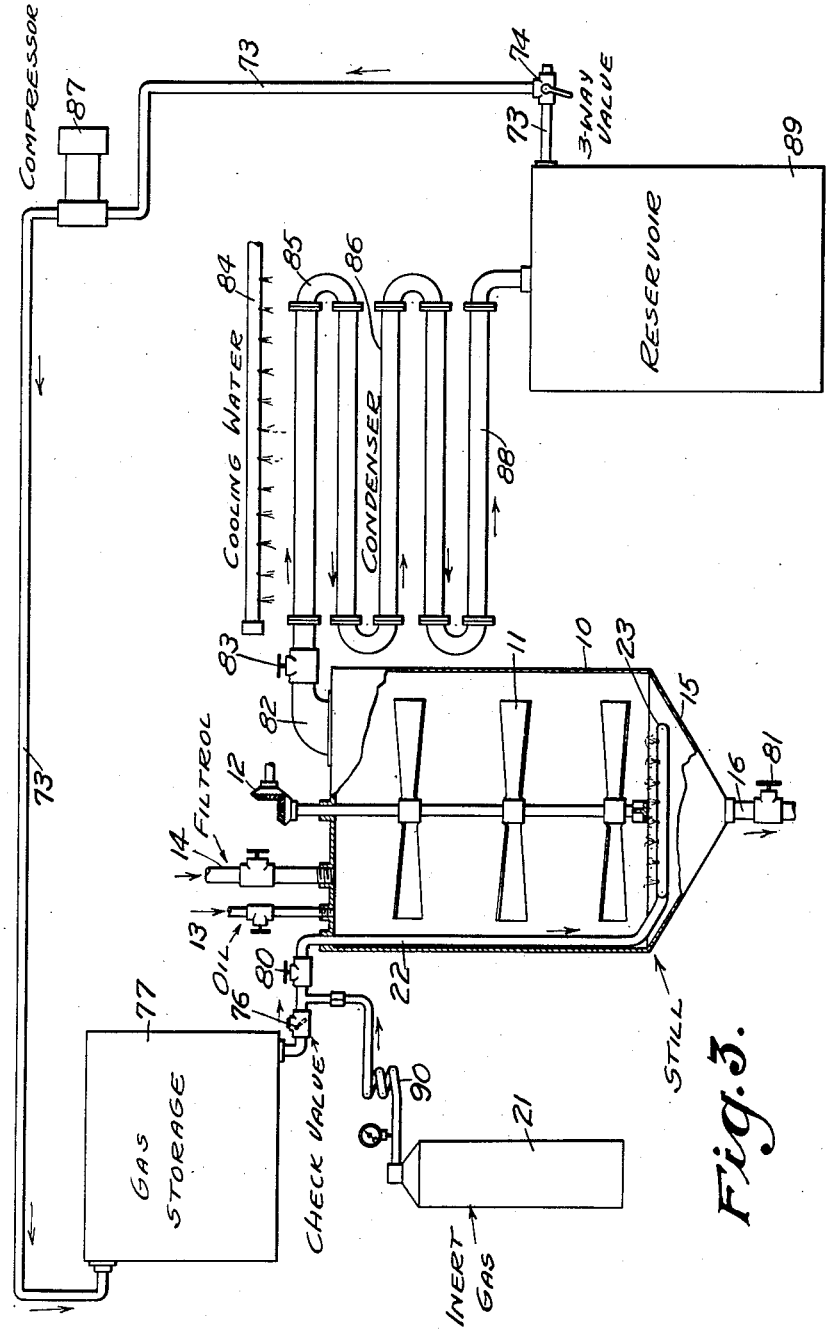
Fig. 3 is a corresponding view of an apparatus adapted to carry out a batch process of distillation with inert gas.

The oils produced from the column 25 and its corresponding member in Figs. 2 and 3 are clear, light colored, dry and of a higher viscosity than can be obtained when steam is used as the injected vapor in place of inert gas. Tests have shown that these oils have as high as 58 seconds of Saybolt at 100° F. higher viscosity than oil produced under identical conditions except the substitution of steam for inert gas. The fact that the recovered oil is dry when distilled with inert gas is the cause of its being of exceptionally high dielectric strength and therefore of exceptional suitability as transformer oil.

In Fig. 2 is illustrated an apparatus which is suitable for contacting the distilled oil with the clay adsorbent when the oil is in the liquid phase. In this figure I illustrate a form of oil recovery tower which has been mentioned in the description of Fig. 1 as being the equivalent of the tower 25 of that figure. It is to be here likewise understood that the form of tower shown in Fig. 1 may be substituted for the one shown.

In Fig. 2 the arrangement of mixing tank, pipe still and source of inert gas is essentially the same as in Fig. 1, so that the description of these parts of the apparatus need not be repeated. Corresponding numerals denote corresponding parts as between Figs. 1 and 2. In Fig. 2, however, the pipe 24 leads to a vapor refining tower 50 at a point near the middle of the tower. Below the point of entrance is a plurality of cascade baffles 51, while above is a plurality of coarsely porous plates 52 of alundum or carborundum upon which a clay adsorbent, preferably acid-activated, is spread in thin layers not more than 3/4 in. deep. A final plate 53 near the top is bare of clay since its function is to prevent the finely divided clay from being carried over with the vapors. The number of clay covered plates may be as many as ten, but three or four are preferable. Only one may be necessary for some work.

The vapor tower is provided with a conical bottom 54 from the apex of which a pipe 55 to which a pump 56 is connected leads back to the agitating tank 10. The entire tower as well as the pipe 55 is preferably heat insulated. A vapor pipe 57 of large diameter is led down from the top of the vapor tower so that the pipe delivers into a cooling box or other form of heat exchanger 58.

The form shown in the drawings is adapted to act also as a preliminary condenser or wash box, since it contains one or more vertically disposed baffles 59 attached to its top inner surface. A cooling coil 63 is provided within the box.

One end of the wash box, that one opposite the vapor inlet, is connected by a large outlet 62 to a stripping tower 60, which may contain either baffles or tower packing 61. The stripping tower's function is to wash oil vapors from the hot stream of inert gas which carries them, and simultaneously to cool that gas. The condensed oil is itself to be used as the stripping medium; therefore a pipe 64, to which a pump 65 is connected, is provided to connect the bottom of the wash box with a spraying device 66 within the tower at the head thereof. A bleeder pipe 67 is placed in the pipe 64 just before a control valve 68, so that a part of the contents of the wash box may be pumped to storage. An outlet pipe 69 is provided at the top of the vapor tower to allow the exit of stripped inert gas. This pipe is connected to a condenser or charcoal stripper, vacuum pump and gasometer, as in Fig. 1, by which the inert gas may be returned to the gas supply vessel (gasometer) 77 for recirculation through the system.

In operation the modified process in this apparatus functions similarly to that described for Fig. 1 until the vapor tower is reached except that no adsorbent is added to the liquid oil. The hot oil empties into the vapor tower through the pipe 24, the oil falling upon the baffles 54 and volatilizing therefrom with the help of the inert gas which is supplied through the ring 23. The oil vapors pass through the plates 52 and the adsorbent above them while excess unvolatilizable oil may be returned to the agitating tank 10 through the pipe 55 and the pump 56, or diverted to other uses.

The oil vapors are purified of coloring matter in their passage through the adsorbent and pass out of the vapor tower through the pipe 57 into the wash box 58 in which a liquid level is maintained. The baffles 59 enforce the passage of the gas through the liquid, thereby aiding condensation, which is also promoted by the cooling coil 63.

The partially stripped gases and vapors continue up the stripping tower 60 in which they meet a countercurrent stream of cool oil. Complete stripping thereupon ensues, the oil refluxing into the wash box, from whence a supply is pumped partially to storage and partially into the tower. The stripped inert gas issuing from the pipe 69 is either rejected or passes through the condenser or absorber 70 and the inert gas separated therefrom is returned to the gasometer 77.

The vapor phase treatment described may be performed under either reduced or atmospheric pressure. It has the advantage of requiring less adsorbent for equal results than the liquid phase process previously described.

Good results may be obtained also when the process is carried out discontinuously as well as continuously. The apparatus shown in Fig. 3 is adapted for batch operation under atmospheric pressure, but can easily be adapted to the vacuum operation shown in Figs. 1 and 2.

In Fig. 3, 10 is an agitating tank which is preferably, although not necessarily, provided with a stirrer 11, driven by bevel gears 12. The tank is substantially closed but is provided with an oil inlet pipe 13, an adsorbent inlet 14, a vapor outlet 82 having therein a valve 83, a gas inlet pipe 22 containing a valve 80, the pipe 22 terminating in a gas distributing ring 23, set in the conical bottom 15 of the tank, this bottom being provided with an outlet pipe 16 having a valve 81. Inert gas may be supplied to the pipe 22 from a high-pressure cylinder 21 through tubing 90. A check valve 76 is placed in the pipe 22 to prevent back pressure on the gasometer 77 to which the pipe 22 also connects. The tank 10 can be heated by any suitable means (not shown) which may be a steam jacket, internal steam oil, or internal electric heater.

The vapor pipe 82 connects to a condenser 86, which may be of any efficient type, but, as here shown, is made up of a plurality of straight pipes 88 connected by return bends 85. The entire condenser may be sprayed with cooling water from a spray pipe 84. Connected to the end of the condenser is a receiver 89, from the upper part of which a pipe 73 extends, the function of which is to carry away the inert gas used in the distillation. A three-way valve 74 is provided at some point in the pipe to furnish optional connection to the atmosphere or to the continuation of the same pipe.

Further along, the pipe 73 connects with a compressor 87, which is adapted to take gas from the receiver 89, compress it and send it through the pipe 73 to the gasometer 77.

In using the apparatus of Fig. 3 in the recovery of used crank case oil, an operation for which it is particularly intended, I first run a suitable charge of oil into the vessel 10 and add from 1% to 30% by weight of oil of powdered adsorbent clay, which may be previously acid-activated, or may be merely good fuller's earth. I prefer to work with about 5% by weight of "Filtrol".

The adsorbent and oil are agitated together while being heated, inert gas, preferably nitrogen, being supplied through the pipe 22 as soon as any substantial amount of oil is volatilized. Cooling water is sprayed over the condenser at the same time. The three-way valve 74 is opened to the atmosphere until the air has been substantially displaced out of the system by hydrocarbon vapors and inert gas. The gas stream is then turned into the compressor 87 and the latter started. After sufficient circulation of inert gas has been established through the system by means of the compressor, the supply from the cylinder 21 may be discontinued.

The oil-adsorbent mixture is heated rapidly to 600° F., or thereabouts, the distillate up to that temperature being regarded as too light for lubricating automobiles and being disposed of so as to leave the receiver 89 empty. The temperature is then slowly raised until substantially all of the remaining oil in the still is distilled, after which the still is cleaned out through the bottom discharge 16 and the operation of distillation repeated with another batch of oil. Revivified adsorbent may be used in this process as well as the fresh, or a mixture of both may be employed.

The batch operation here described may also be performed with inert gas at sub-atmospheric pressure, as indicated in the description of Figs. 1 and 2. Experiments have shown that the crank case oil recovered by my process is superior to the original fresh oil in many instances.

The continuous operation of the apparatus shown in Figs. 1 and 2 may be obtained in two ways, either by providing a plurality of mixing tanks 10 and operating each of these on the batch system and using each in turn as a source of supply for the pipe still, or by using only one tank 10 and continuously running therein a stream of oil and a stream of clay, these streams being in the ratios before given, and running out of said tank a stream of the mixture equal in volume to the combined inflowing streams.

I claim as my invention:

1. The process which comprises heating a mixture of oil and adsorbent clay to a fractionating temperature in a flowing stream, emptying said stream of mixture directly into a fractionating space, continuously injecting inert fixed gas into the lower part of said fractionating space, continuously removing heavy fractions and oily clay from the bottom of said fractionating space, removing the condensed fractions from said fractionating space, withdrawing the fixed gas and the uncondensed portion of said stream of mixture from the top of said fractionating space, separating the oil from the inert gas, and then recycling the inert fixed gas.

2. A process according to claim 1 in which the clay is acid activated clay of the smectite type.

3. A process according to claim 1 in which the inert fixed gas is heated nitrogen.

4. A process according to claim 1 in which the oil is used automobile crank case oil.

5. A process according to claim 1 in which the fractionating space is held under reduced pressure.

6. A process according to claim 1 in which the fractionating space contains layers of powdered adsorbent clay, and in which a substantial portion of the lighter vapors of the oil are compelled to pass through said layers.

7. A process which comprises heating a stream of oil to an oil fractionating temperature, emptying the said stream directly into a fractionating space below a plurality of layers of adsorbent clay, continuously injecting inert fixed gas at the bottom of the space, continuously removing heavy fractions and oily clay from the bottom, and lighter fractions from the spaces above the clay layers, separating the oil fractions from the inert gas and then recycling the inert fixed gas.

8. A process according to claim 7 in which the fractionating space is held under reduced pressure.

9. A process which comprises: heating a stream of oil to a temperature of at least 500° F., emptying said stream directly into a fractionating space below at least one layer of adsorbent clay, continuously injecting nitrogen into the lower part of said fractionating space, removing heavy fractions and oily clay from the bottom of said fractionating space, withdrawing the lighter fractions and inert gas from the top of said fractionating space, separating the oil from said inert gas, and then recycling said nitrogen.

10. The process which comprises: heating a mixture of oil and adsorbent clay in a flowing stream to a temperature of at least 500° F., emptying said stream of mixture directly into a fractionating space, continuously injecting nitrogen into the lower part of said fractionating space, removing heavy fractions and oily clay from the bottom of said fractionating space, removing the condensed fractions from said fractionating space, and removing the nitrogen and the uncondensed portion of said stream of mixture from the top of said fractionating space, separating the said uncondensed oil from said nitrogen, and recycling the nitrogen.

In testimony whereof, I have hereunto set my hand at Los Angeles, California, this 3rd day of June, 1929.

DANIEL S. BELDEN.